United States Patent
Kim et al.

(10) Patent No.: US 11,101,551 B2
(45) Date of Patent: Aug. 24, 2021

(54) ANTENNA DEVICE

(71) Applicant: KMW INC., Hwaseong-si (KR)

(72) Inventors: Duk Yong Kim, Hwaseong-si (KR); Young Chan Moon, Hwaseong-si (KR); Min Sik Park, Hwaseong-si (KR); Chang Woo Yoo, Hwaseong-si (KR); Bae Mook Jeong, Hwaseong-si (KR); Nam Shin Park, Hwaseong-si (KR); Min Seon Yun, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 186 days.

(21) Appl. No.: 16/412,336

(22) Filed: May 14, 2019

(65) Prior Publication Data

US 2019/0267701 A1    Aug. 29, 2019

Related U.S. Application Data

(63) Continuation of application No. PCT/KR2017/013029, filed on Nov. 16, 2017.

(30) Foreign Application Priority Data

Nov. 16, 2016  (KR) .................. 10-2016-0152609
Mar. 6, 2017   (KR) .................. 10-2017-0028558

(51) Int. Cl.
*H01Q 1/40*     (2006.01)
*H01Q 1/24*     (2006.01)
*H01Q 1/42*     (2006.01)
*H04B 17/11*    (2015.01)
*H04B 17/21*    (2015.01)
*H04B 7/0452*   (2017.01)

(52) U.S. Cl.
CPC .............. *H01Q 1/246* (2013.01); *H01Q 1/42* (2013.01); *H04B 7/0452* (2013.01); *H04B 17/11* (2015.01); *H04B 17/21* (2015.01)

(58) Field of Classification Search
CPC .......... H01Q 1/246; H01Q 1/42; H01Q 3/267; H01Q 1/12; H01Q 21/28; H04B 17/11; H04B 17/21; H04B 7/0452
See application file for complete search history.

(56) References Cited

U.S. PATENT DOCUMENTS

2002/0162924 A1   11/2002  Herzog
2011/0188205 A1*   8/2011  MacManus ........ H05K 7/20127
                                                         361/703
(Continued)

FOREIGN PATENT DOCUMENTS

CN      102035061 A    4/2011
JP      2008-244581 A  10/2008
(Continued)

OTHER PUBLICATIONS

A Japanese office action dated Jul. 14, 2020 for Japanese Application No. 2019-524961.

(Continued)

*Primary Examiner* — Dieu Hien T Duong

(57) ABSTRACT

Provided is an antenna device including a first antenna body, and a power supply module detachably attached to the first antenna body. The power supply module is provided on a fastening region of a first radiation fin of the first antenna body.

13 Claims, 16 Drawing Sheets

(56) References Cited

U.S. PATENT DOCUMENTS

| | | | |
|---|---|---|---|
| 2014/0033496 A1 | 2/2014 | Lettkeman et al. | |
| 2016/0261030 A1 | 9/2016 | Kim et al. | |
| 2017/0237160 A1* | 8/2017 | Kim .......................... | H01F 1/00 343/745 |

FOREIGN PATENT DOCUMENTS

| | | |
|---|---|---|
| KR | 10-2015-0012565 A | 2/2015 |
| KR | 10-2016-0052311 A | 5/2016 |
| WO | 2015072727 A1 | 5/2015 |
| WO | 2015/172871 A2 | 11/2015 |
| WO | 2016/072698 A1 | 5/2016 |
| WO | 2016/134764 A1 | 9/2016 |
| WO | 2016/177115 A1 | 11/2016 |

OTHER PUBLICATIONS

International Search Report for PCT/KR2017/013029 dated Feb. 20, 2018 and its English translation.

A first office action mailed from Chinese Patent Office dated Dec. 31, 2020 for Chinese Application No. 2017800703901 and its English translation.

\* cited by examiner

ANTENNA DEVICE

CROSS-REFERENCE TO RELATED APPLICATION

This application is a continuation application of International Application No. PCT/KR2017/013029, which claims priority under 35 U.S.C § 119(a) of Korean Patent Application No. 10-2016-0152609, filed on Nov. 16, 2016, and Korean Patent Application No. 10-2017-0028558, filed on Mar. 6, 2017, in the Korean Intellectual Property Office (KIPO), the entire contents of which are incorporated herein by reference.

TECHNICAL FIELD

The present invention relates to an antenna device, and more particularly, to an antenna apparatus for wireless communication.

BACKGROUND ART

A wireless communication technique, e.g., a multiple-input multiple-output (MIMO) technique, is a spatial multiplexing technique for dramatically increasing a data transmission rate using a plurality of antennas, in which a transmitter transmits different data via transmission antennas and a receiver identifies the transmitted different data through appropriate signal processing.

Accordingly, more data may be transmitted by increasing a channel capacity by increasing both the number of transmitting antennas and the number of receiving antennas. For example, it is possible to secure a channel capacity that is about 10 times that of a current single antenna system by increasing the number of antennas to 10, when the same frequency band is used.

Up to 8 antennas are used in 4G LTE-Advanced. Products with 64 or 128 antennas are currently being developed at a pre-5G stage. In 5G, base station equipment with a much larger number of antennas is expected to be used, which is called massive MIMO technology. Current cell operation is two-dimensional, whereas when massive MIMO technology is employed, three-dimensional (3D)-beamforming can be performed and thus massive MIMO technology is also called full-dimensional (FD)-MIMO.

In Massive MIMO technology, as the number of antennas is increased, the numbers of transmitters and filters increase accordingly. Nevertheless, due to lease costs of an installation space or space constraints, the success or failure of an antenna employing massive MIMO technology depends on how small, light, and expensive RF machine parts (antenna elements/filters/power amplifiers/transceivers, etc.) are. A high power output is necessary to expand coverage of a massive MIMO antenna but power consumption and heat caused by the high power output are negative factors in reducing the weight and size of the antenna.

DISCLOSURE

Technical Problem

To address the above problem, the present invention is directed to a high-power antenna device having excellent heat dissipation characteristics.

The present invention is also directed to an antenna device having a reduced size.

The present invention is also directed to an antenna device with a power supply module having excellent compatibility and applicability.

The present invention is also directed to a multiple-input multiple-output (MIMO) antenna device having a compact and lightweight stacked structure.

Technical Solution

In accordance with one aspect of the present invention, an antenna device includes an antenna body, and a power supply module detachably attachable to the antenna body.

The antenna body includes a main body housing, a first radiation fin on a side of the main body housing, a first power connector at a side of the main body housing, and a first module fastening part on a side of the main body housing.

The power supply module includes a module housing, a second radiation fin on one side of the module housing, a second power connector provided on another side of the module housing, and electrically connectable to the first power connector, and a second module fastening part detachably fastened with the first module fastening part.

The first radiation fin includes plate members extending in parallel in a lengthwise direction of the antenna body.

The first radiation fin may include a fastening region overlapping the power supply module and a non-fastening region not overlapping the power supply module. The first radiation fin may have a first thickness in the non-fastening region in a thickness direction of the antenna body and have a second thickness in the fastening region in the thickness direction of the antenna body. The first thickness may be greater than the second thickness.

The first radiation fin may be integrally formed with the main body housing.

The first module fastening part may extend beyond the first radiation fin from a side of the main body housing in a thickness direction of the antenna body.

The first module fastening part may further include a guide rail, and an entrance and exit opening provided in a side of the guide rail. The second module fastening part may include an insertion pin configured to be inserted into the guide rail via the entrance and exit opening.

The antenna body may further include a radome on another side of the main body housing.

In accordance with another aspect of the present invention, an antenna device includes an antenna body, and a power supply module detachably attachable to the antenna body. The antenna body includes a main body housing, a first power connector at a side of the main body housing, and a first module fastening part which is provided on a side of the main body housing and includes a guide rail and an entrance and exit opening provided in a side of the guide rail. The guide rail includes a fall prevention section between one end of the guide rail and the entrance and exit opening.

The power supply module includes a module housing, a second power connector electrically connectable to the first power connector, and a second module fastening part which is detachably fastened with the first module fastening part and includes an insertion pin configured to be inserted into the guide rail via the entrance and exit opening.

The guide rail may extend along one edge of the first module fastening part.

The entrance and exit opening may be in a shape formed by opening a portion of the guide rail.

The guide rail may further include a fastening guide section between another end of the guide rail and the entrance and exit opening, and the fall prevention section may be shorter than the fastening guide section.

The first power connector may include a first power terminal, the second power connector may include a second power terminal, and the first power terminal and the second power terminal may be aligned with each other while the insertion pin is inserted into the guide rail.

The antenna body may further include a first radiation fin on a side of the main body housing, and the first module fastening part may extend beyond the first radiation fin from a side of the main body housing in a thickness direction of the antenna body.

The first module fastening part may further include a closed sidewall at an outer side of the guide rail.

The entrance and exit opening may include an inclined side in a direction from one end of the guide rail to another end of the guide rail, the inclined side having an inclination angle in an outward direction of one edge of the first module fastening part.

In accordance with another aspect of the present invention, there is provided a multiple-input multiple-output (MIMO) antenna system with an antenna assembly having a stacked structure. In the MIMO antenna system, the antenna assembly having the stacked structure is embedded between a radome and a housing having a heat sink on a rear side thereof. The antenna assembly having the stacked structure includes a first printed circuit board (PCB) on which a feeding network is provided, a plurality of antenna elements installed on an upper surface of the first PCB opposite the radome and connected to the feeding network, and a filter assembly provided on a lower surface of the first PCB and including a plurality of band-pass filters connected to the feeding network. The antenna assembly having the stacked structure further includes a second PCB which is arranged opposite the housing, the second PCB including a plurality of transmission/reception circuits connected to the plurality of band-pass filters.

Other features and aspects of the present invention will be apparent from the detailed description and the drawings.

MODE OF INVENTION

Figure 1:
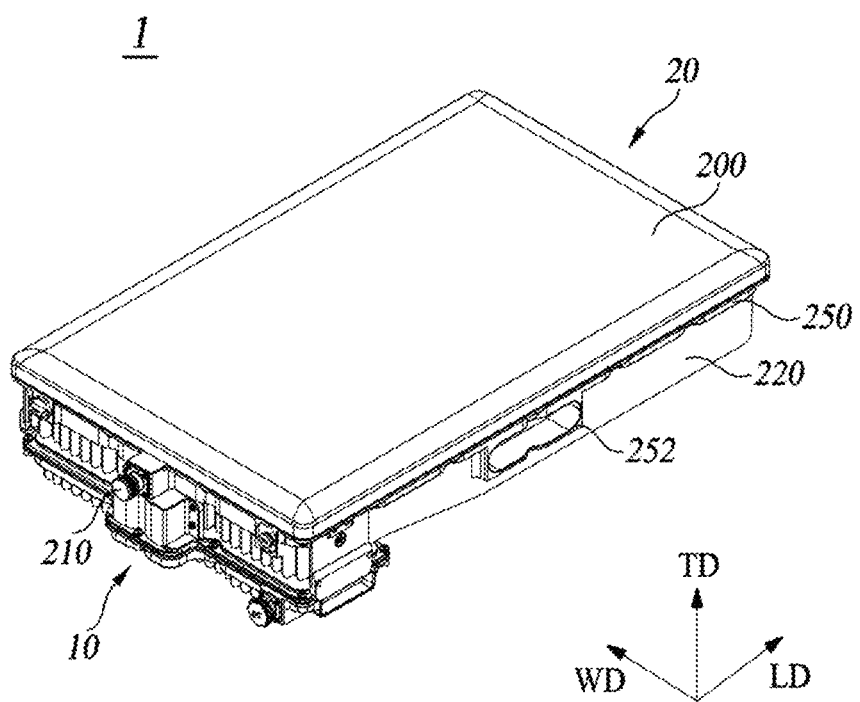
FIG. 1 is a front and side perspective view of an antenna device according to an embodiment of the present invention.

Hereinafter, some embodiments of the present invention will be described in detail with reference to the accompanying drawings. It should be noted that the same reference numerals are assigned to the same elements even in different drawings, if possible. In the following description of the present invention, well-known functions or constructions are not described in detail if it is determined that they would obscure the invention due to unnecessary detail.

FIG. 1 is a front and side perspective view of an antenna device according to an embodiment of the present invention.

Figure 2:
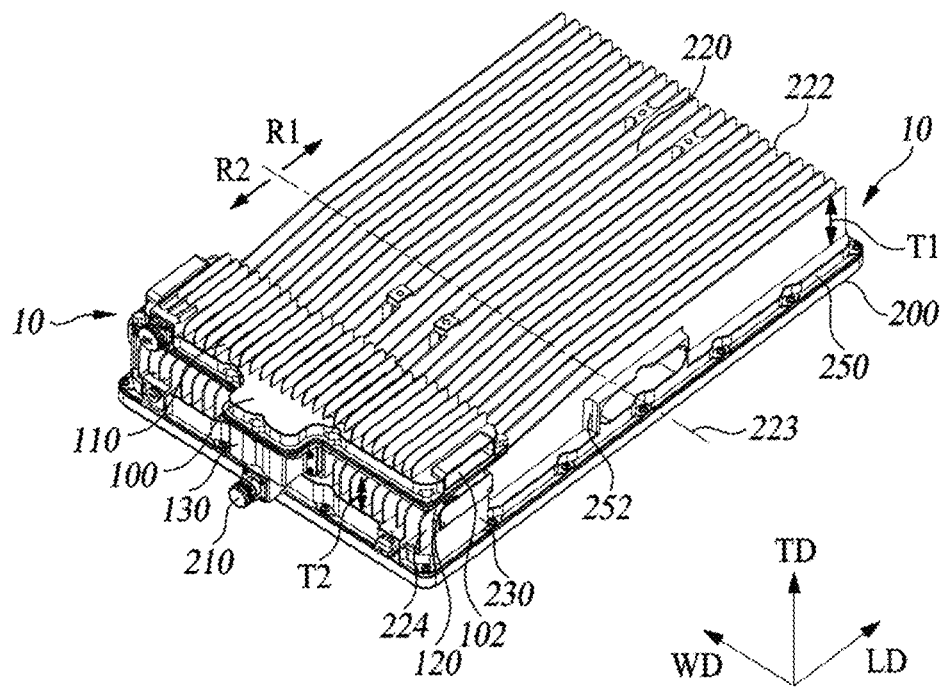
FIG. 2 is a rear and side perspective view of an antenna device according to an embodiment of the present invention.

FIG. 2 is a rear and side perspective view of an antenna device according to an embodiment of the present invention.

Figure 3:
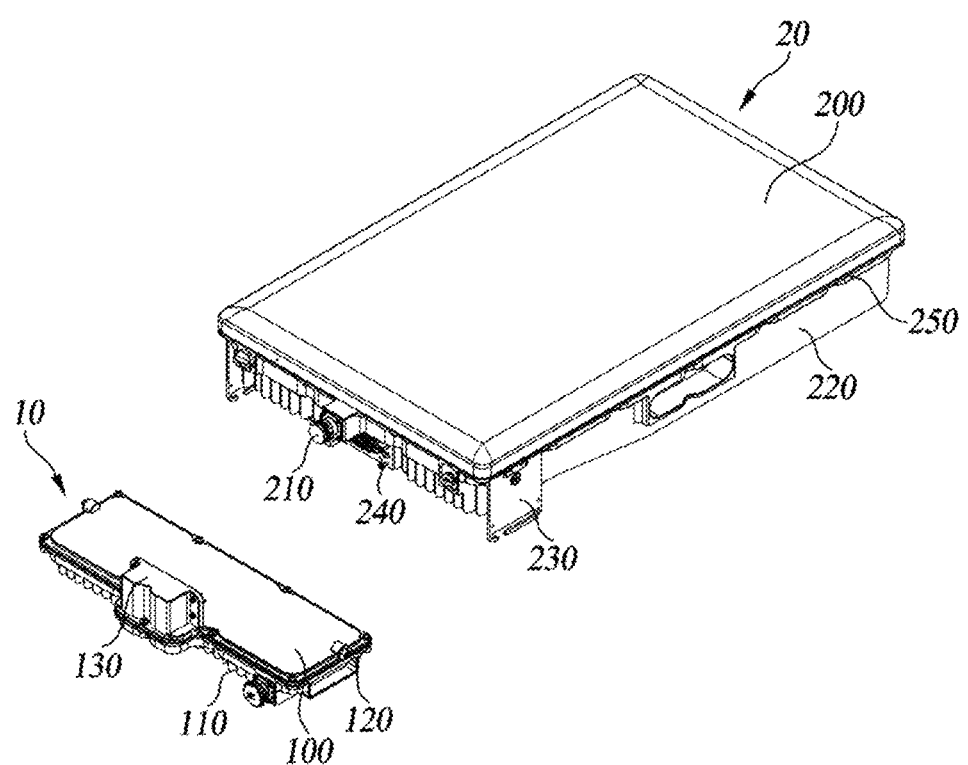
FIG. 3 is a partially exploded perspective view of an antenna device according to an embodiment of the present invention.

FIG. 3 is a partially exploded perspective view of an antenna device according to an embodiment of the present invention.

Referring to FIGS. 1 to 3, an antenna device 1 according to an embodiment of the present invention includes an antenna body 20, and a power supply module 10 detachably attachable to the antenna body 20.

FIGS. 1 and 2 illustrate a state in which the power supply module 10 is attached to the antenna body 20. FIG. 3 illustrates a state in which the power supply module 10 is separated or detached from the antenna body 20.

The antenna body 20 may be supplied with power from the power supply module 10, and may establish wireless communication with an external terminal or base stations via a wireless transmitting and receiving module (not shown) installed therein. In one embedment of the present invention, the antenna body 20 may be a multiple-input multiple-output (MIMO) wireless communication antenna.

In one embedment of the present invention, the antenna body 20 of the antenna device 1 may include a main body housing 250, a radome 200, a first radiation fin 220, a first power connector 240, a wired transmitting and receiving terminal 210, and first module fastening parts 230.

The main body housing 250 may be a rigid support structure supporting a wireless transmitting and receiving module (not shown) included therein while covering an outer side thereof.

In the present specification, one of two opposite sides of a structure will be referred to as one side and the other will be referred to as another side. A side having a relatively large area of a structure will be referred to as a large side, and sides surrounding the large side and each having a narrower area than the area of the large side will be referred to as sides. Among the sides, a relatively long side will be referred to as a long side and a relatively short side will be referred to as a short side.

In one embodiment of the present invention, the main body housing 250 may take the form of a thin box having two opposite large sides and other sides, e.g., a rectangular parallelepiped having two large sides and four sides. However, the present invention is not limited thereto, and an external shape of the main body housing 250 may vary according to accessibility to an installation place, a wireless transmission and reception method, the types of the transmitting and receiving module included therein, etc.

The main body housing 250 may include a body handle 252 on at least one side thereof. A worker may install the antenna device 1 or the antenna body 20 according to an embodiment of the present invention in an installation place by grasping the body handle 252.

The radome 200 may be provided on a large side of the main body housing 250. The radome 200 may be a cover member covering the main body housing 250 to protect an inner space of the main body housing 250 from rain, external moisture, or various types of pollutants. The radome 200 may be formed of a material, e.g., an electrically insulating plastic material, which allows a radio signal to pass therethrough and to be transmitted to the inside or outside of the main body housing 250.

In the present specification, a side or large side of the main body housing 250 at which the radome 200 is provided will be referred to as a front side, and another side or large side thereof opposite the front side will be referred to as a rear side.

The first radiation fin 220 may be provided on the other side, i.e., the rear side, of the main body housing 250. The first radiation fin 220 may be formed of a thermally conductive member, for example, a metal.

The first radiation fin 220 may include a plurality of slender plate members extending in parallel along long sides of the main body housing 250, i.e., in a lengthwise direction LD of the antenna body 20. The plurality of slender plate members may be spaced apart from each other in a widthwise direction WD of the main body housing 250, and spaces between the slender plate members may also extend in parallel in the lengthwise direction LD of the antenna body 20.

The first radiation fin 220 may have different heights with respect to a branch line 223 in a thickness direction TD of the antenna body 20. The first radiation fins 220 may include a fastening region R2 fastened with the power supply module 10 while overlapping the power supply module 10, and a non-fastening region R1 which is not fastened with the power supply module 10 and does not overlap the power supply module 10. One end 222 of the first radiation fin 220 in the non-fastening region R1 may have a first thickness T1. Another end 224 of the first radiation fin 220 in the fastening region R2 may have a second thickness T2 less than the first thickness T1 in the non-fastening region RE In one embodiment of the present invention, the height of the first radiation fin 220 may taper along long sides thereof toward an end of the fastening region R2, starting from the branch line 223.

As the height of the first radiation fin 220 in the fastening region R2 tapers in the thickness direction TD, a space for fastening the power supply module 10 may be secured and a total thickness of the antenna device 1 may decrease.

In one embodiment of the present invention, the first radiation fin 220 may be provided on the rear side of the main body housing 250. For example, the first radiation fin 220 may be integrally formed with the main body housing 250. However, the present invention is not limited thereto, and the first radiation fin 220 may be manufactured as a separate member, and welded on the rear side of the main body housing 250, adhered on the rear side of the main body housing 250 via a thermally conductive adhesive, or fixed on the rear side of the main body housing 250 via a separate fastening member such as a bolt.

The first power connector 240 may be provided on a side, e.g., a short side, of the main body housing 250. The first power connector 240 may be provided adjacent to an end of the fastening region R2 of the first radiation fin 220. The first power connector 240 may be electrically connected to the power supply module 10, and transmit power supplied from the power supply module 10 to the transmitting and receiving modules inside the main body housing 250.

The wired transmitting and receiving terminal 210 may be provided on a side, e.g., a short side, of the main body housing 250. The wired transmitting and receiving terminal 210 may be connected to an external wired repeater via wire, and transmit a signal transmitted or received via wire to the transmitting and receiving modules inside the main body housing 250.

The first module fastening parts 230 may be provided on at least one side, e.g., the two long sides, of the main body housing 250. For example, the first module fastening parts 230 may be provided on an end of the fastening region R2 of the first radiation fin 220 to be adjacent to a border between the two long sides and one short side of the main body housing 250, and may extend downward from the rear side or the long sides of the main body housing 250 in the thickness direction TD.

The first module fastening parts 230 may be detachably fastened with second module fastening parts 120 of the power supply module 10.

A shape and function of the first module fastening parts 230 according to an embodiment of the present invention will be described in detail with reference to FIGS. 4 to 8 below.

In one embodiment of the present invention, the power supply module 10 of the antenna device 1 may include a module housing 100, a second radiation fin 110, a second power connector 130, and the second module fastening parts 120.

The module housing 100 may be a rigid support structure supporting a power supply device (not shown) included therein while covering an outer side thereof. The power supply device may be an electric converter that converts power supplied from an external power source into a voltage required for the antenna body 20 to be fastened. The module housing 100 may have a box shape having two large sides and other sides, e.g., a rectangular parallelepiped shape having two large sides and four sides. However, the present invention is not limited thereto, and an external shape of the main body housing 250 may vary according to the amount of power required, an external shape and size of the antenna body 20, etc.

The module housing 100 includes a module handle 102 on at least one side thereof. A worker may fasten the power supply module 10 with the antenna body 20 or unfasten or detach the power supply module 10 from the antenna body 20 by grasping the module handle 102.

In one embodiment of the present invention, while the power supply module 10 according to an embodiment is fastened, one large side of the module housing 100 may be arranged adjacent to the first radiation fin 220. The large side of the module housing 100 may be arranged as close as possible to the first radiation fin 220 within a range that the heat dissipation performance of the first radiation fin 220 is not degraded, thereby reducing a total size, i.e., a thickness, of the antenna device 1.

In the present specification, the large side of the module housing 100 adjacent to the first radiation fin 220 will be referred to as a front side, and another side or large side opposite the front side will be referred to as a rear side.

The second radiation fin 110 may be provided on the other large side, i.e., the rear side, of the module housing 100. The second radiation fin 110 may be formed of a thermally conductive material, e.g., a metal.

The second radiation fin 110 may include a plurality of slender plate members extending in parallel along short sides of the module housing 100, i.e., in the lengthwise direction LD of the antenna body 20 while the second radiation fin 110 is fastened.

In one embodiment of the present invention, the second radiation fin 110 may be provided on the rear side of the module housing 100. For example, the second radiation fin 110 may be integrally formed with the module housing 100. However, the present invention is not limited thereto, and the second radiation fin 110 may be manufactured as a separate member, and welded on the rear side of the module housing 100, adhered on the rear side of the module housing 100 via a thermally conductive adhesive, or fixed on the rear side of the module housing 100 via a separate fastening member such as a bolt.

The second power connector 130 may be provided on an outer side, e.g., the front side or a side, of the module housing 100. The second power connector 130 may be provided adjacent to a border between a long side of the module housing 100 and the front side of the module housing 100. The second power connector 130 may be electrically connected to the antenna body 20, and transmit power supplied from the power supply module 10 inside the module housing 100 to the first power connector 240 of the antenna body 20.

While the second power connector 130 is fastened, the second power connector 130 of the power supply module 10 may be located adjacent to the first power connector 240 of the antenna body 20. Each of the first power connector 240 and the second power connector 130 may include a fixed opening, and the power supply module 10 and the antenna body 20 may be firmly fixed when fixing bolts are inserted into and fastened with the fixed openings of the first power connector 240 and the second power connector 130.

The second module fastening parts 120 may be provided on at least one side, e.g., two short sides, of the module housing 100.

The second module fastening parts 120 may be detachably fastened with the first module fastening parts 230.

In one embodiment of the present invention, a shape and function of the second module fastening parts 120 will be described in detail with reference to FIGS. 4 to 8 below.

In one embodiment of the present invention, the antenna device 1 is a type of energy conversion and consumption device converting electrical energy into a transmission/reception radio wave, and generates a considerable amount of heat during the conversion or consumption of energy. When the wireless transmitting and receiving modules inside the main body housing 250 are overheated, the lifespan of the antenna device 1 may be significantly reduced. Furthermore, as the temperature of the wireless transmitting and receiving modules increases, the sensitivity thereof may change. Particularly, a temperature deviation according to positions of the wireless transmitting and receiving modules may cause sensitivity deviation of the wireless transmitting and receiving modules. Such a sensitivity change according to the temperature of the wireless transmitting and receiving modules or a sensitivity deviation according to the positions of the wireless transmitting and receiving modules may deteriorate the accuracy of transmission or reception performance of the antenna device 1 and reduce a transmission or reception rate.

Similarly, the power supply module 10 is, for example, a type of electric energy conversion and consumption member which increases or decreases a voltage, converts the frequency of an alternating-current (AC) voltage, or converts an AC voltage into a direct-current (DC) voltage or vice versa, and generates a considerable amount of heat during the conversion or consumption of energy.

It is desirable that the power supply module 10 be arranged apart from the antenna body 20, because heat generated by the power supply module 10 may adversely affect the transmitting and receiving module inside the antenna body 20.

An easiest approach to arrange the power supply module 10 apart from the antenna body 20 is to place the power supply module 10 and the antenna body 20 on the same plane to be adjacent to each other. However, in this case, the total size of the antenna device 1 may increase, and in particular, the mechanical strength between fastened portions of the power supply module 10 and the antenna body 20 may deteriorate.

In contrast, the antenna device 1 according to an embodiment of the present invention has a structure, in which the power supply module 10 is arranged such that at least a portion thereof overlaps the antenna body 20 to substantially thermally separate the power supply module 10 from the antenna body 20. Specifically, in an embodiment of the present invention, because the first radiation fin 220 is arranged between the main body housing 250 of the antenna body 20 and the power supply module 10, the power supply module 10 and the antenna body 20 may be spatially and thermally separated from each other. Furthermore, because the first radiation fins 220 extend in the lengthwise direction of the antenna body 20, the space between the slender plate members of the first radiation fin 220 may be exposed to the outside and convection of the air may be smoothly implemented over the entire first radiation fin 220, even when part of the first radiation fins 220 is covered with the power supply module 10. That is, the first radiation fins 220 may smoothly dissipate heat from the whole rear side of the antenna body 20, so that temperatures of the main body housing 250 and the transmitting and receiving modules therein may be uniform.

A type and form of an external power source to which the power supply module 10 is connected, and a form of a power supply of the antenna body 20 may vary by country or according to a relevant communication system.

The antenna device 1 according to one embodiment of the present invention includes, as a power source, the power supply module 10 which is detachably attachable, and thus, another power supply module having a different power supply capacity and an external power connector and employing a voltage conversion method may be employed, if necessary. Accordingly, the device compatibility and applicability of the antenna device 1 according to an embodiment of the present invention may be increased.

Figure 4:
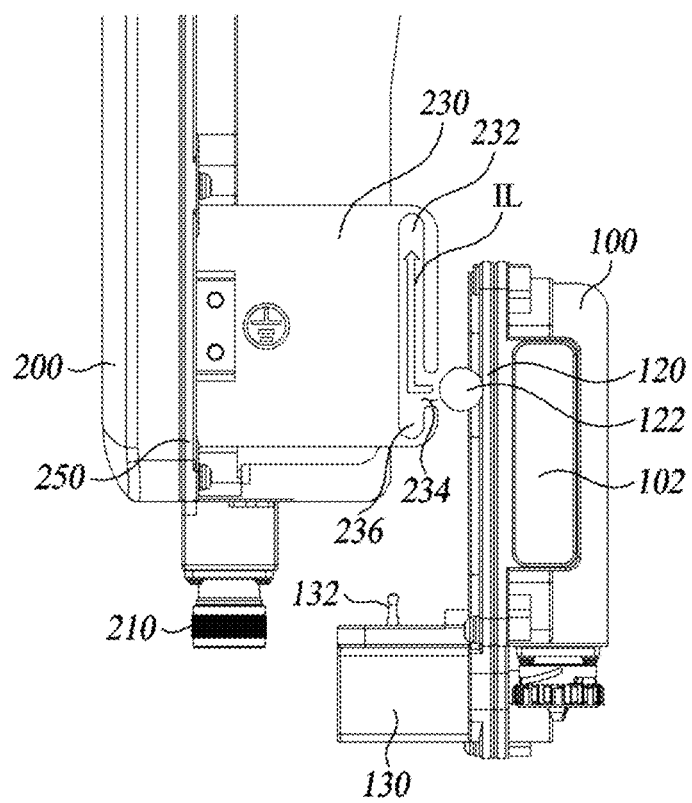
FIG. 4 is a partial side view of an antenna device according to an embodiment of the present invention.

FIG. 4 is a partial side view of an antenna device according to an embodiment of the present invention.

Figure 5:
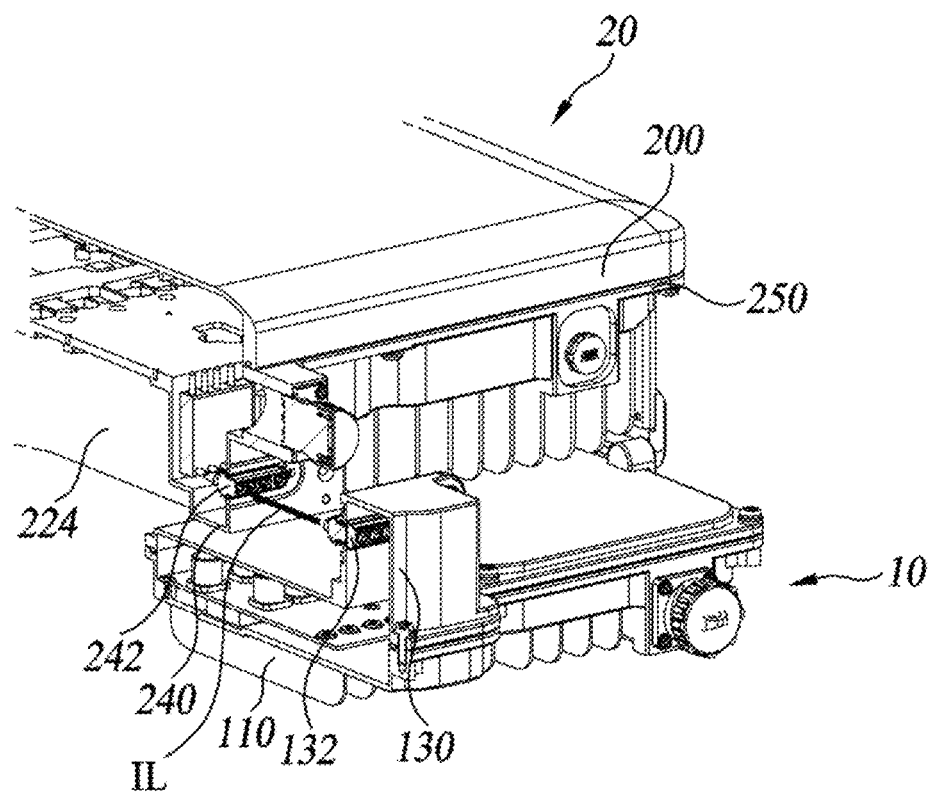
FIG. 5 is a partially cutaway perspective view of an antenna device according to an embodiment of the present invention.

FIG. 5 is a partially cutaway perspective view of an antenna device according to an embodiment of the present invention.

FIGS. 4 and 5 illustrate a state in which a power supply module of an antenna device according to an embodiment of the present invention is separated from an antenna body.

Referring to FIGS. 4 and 5, the first module fastening part 230 of the antenna device 1 according to an embodiment of present invention may include guide rails 232 and 234 and an entrance and exit opening 234.

The first module fastening part 230 may extend beyond the first radiation fin 220 from the rear side or long side of the main body housing 250.

The guide rails 232 and 234 may extend along an edge of the first module fastening part 230. The guide rails 232 and 234 may extend in a lengthwise direction of the main body housing 250.

The entrance and exit opening 234 may be provided in a side of the guide rails 232 and 234. For example, the entrance and exit opening 234 may be in a shape formed by cutting or opening part of an edge of the first module fastening part 230 on which the guide rails 232 and 234 are provided.

The guide rails 232 and 234 may include a fall prevention section 236 between an end of each of the guide rails 232 and 234 and the entrance and exit opening 234, and a fastening guide section 232 between another end of each of the guide rails 232 and 234 and the entrance and exit opening 234.

The fall prevention section 236 may be shorter than the fastening guide section 232.

The second module fastening part 120 may include an insertion pin 122 configured to be inserted into the guide rails 232 and 234 via the entrance and exit opening 234.

A structure and size of the insertion pin 122 may be set such that the insertion pin 122 is inserted into the guide rails 232 and 234 only via the entrance and exit opening 234, so that the insertion pin 122, when inserted into the guide rails 232 and 234 via the entrance and exit opening 234, may be moved in a lengthwise direction of the guide rails 232 and 234 or a direction in which the guide rails 232 and 234 extend.

The first power connector 240 may include a first power terminal 242, and the second power connector 130 may include a second power terminal 132 configured to be coupled to the first power terminal 242. In the illustrated embodiment, the first power terminal 242 is a female terminal and the second power terminal 132 is a male terminal, and the second power terminal 132 is illustrated as being inserted into the first power terminal 242. However, the present invention is not limited thereto, and the first power terminal 242 and the second power terminal 132 may be arbitrary terminal structures for electrical connection.

A worker may move the power supply module 10 by grasping the module handle 102 thereof such that the insertion pin 122 of the power supply module 10 may be moved along an insertion line IL illustrated in FIG. 4. Because the insertion pin 122 of the power supply module 10 is guided by the guide rails 232 and 234 of the antenna body 20 to be moved along the insertion line IL, the first power terminal 242 and the second power terminal 132 when fastened with each other may be aligned with each other, and the second power terminal 132 may be moved along the insertion line IL to be connected to the first power terminal 242 as illustrated in FIG. 5.

That is, a worker may easily connect the first power terminal 242 and the second power terminal 132 by simply inserting the insertion pin 122 of the power supply module 10 into the entrance and exit opening 234 of the antenna body 20 without having to check the alignment of the first power terminal 242 and the second power terminal 132 with the naked eye.

In particular, the antenna device 1 according to one embodiment of the present invention may be installed at a high altitude. In general, in the case of working at high height, an installation place may be limited, and the worker may have difficulty identifying and combining terminals with the naked eye. However, in the case of the antenna device 1 according to an embodiment of the present invention, a worker may identify the power supply module 10 and the antenna body 20 and fasten the power supply module 10 with the antenna body 20 or unfasten the power the power supply module 10 from the antenna body 20 with the naked eye, and thus, the first power terminal 242 and the second power terminal 132 which cannot be identified with the naked eye may be connected to each other or disconnected from each other, when aligned with each other.

Figure 6:
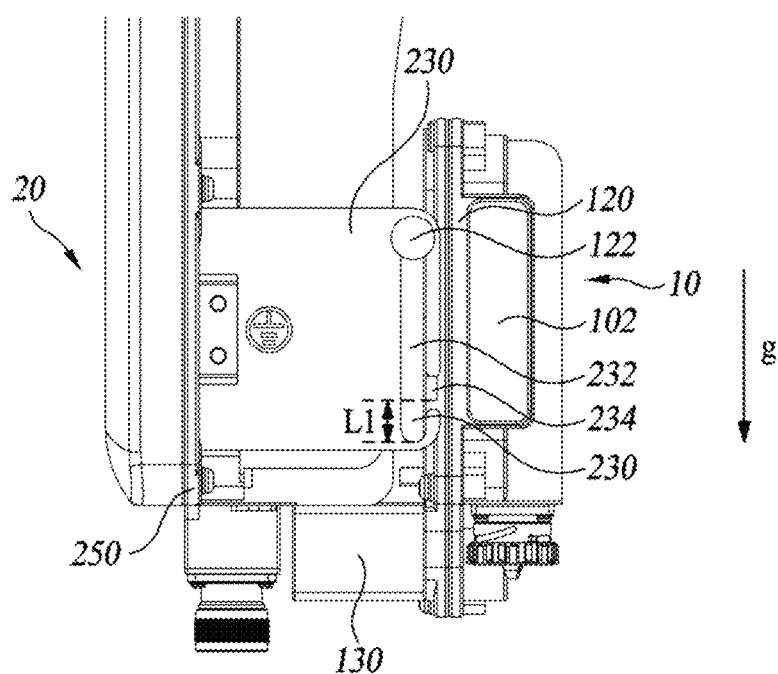
FIG. 6 is a partial side view of an antenna device that is in a fastened state, according to the embodiment of the present invention.

FIG. 6 is a partial side view of an antenna device that is in a fastened state, according to the embodiment of the present invention.

Figure 7:
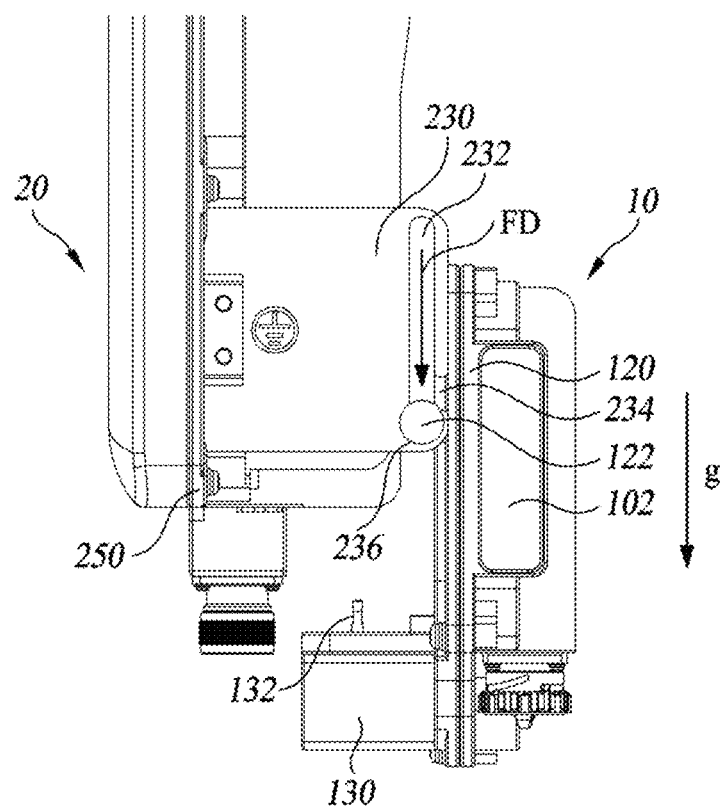
FIG. 7 is a partial side view of an antenna device that is in a falling state, according to an embodiment of the present invention.

FIG. 7 is a partial side view of an antenna device that is in a falling state, according to an embodiment of the present invention.

Figure 8:
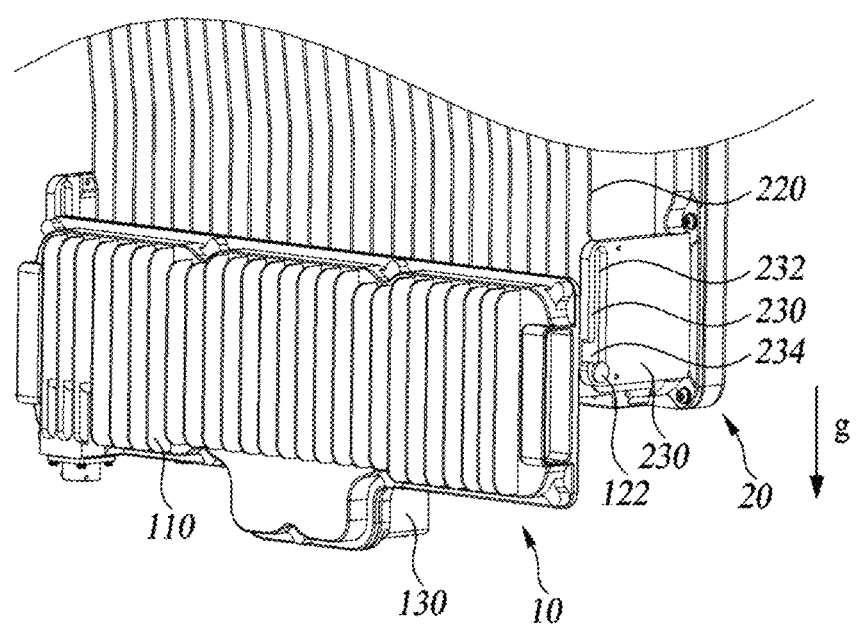
FIG. 8 is a partial perspective view of an antenna device that is in a falling state, according to an embodiment of the present invention.

FIG. 8 is a partial perspective view of an antenna device that is in a falling state, according to an embodiment of the present invention.

Referring to FIG. 6, the antenna device 1 according to an embodiment of the present invention may be installed such that the lengthwise direction of the antenna body 20 is parallel to the direction of gravity. In this case, the direction in which the guide rails 232 and 234 extend may be parallel to the direction of gravity.

A worker may unfasten the power supply module 10 from the antenna body 20 by releasing the fixing bolts, pulling the power supply module 10 in the direction of gravity by grasping the module handle 102 of the power supply module 10, and pushing the insertion pin 122 to the outside via the entrance and exit opening 234.

Referring to FIGS. 6 to 8, the power supply module 10 may fall in the direction of gravity when workers, and particularly, one worker releases the fixing bolts or when the worker pulls the power supply module 10 out of the antenna body 20 with an excessive force.

However, the fall prevention section 236 of the guide rails 232 and 234 of the antenna device 1 according to an embodiment of the present invention is provided downward in the direction of gravity during installation, and thus, the power supply module 10 may be prevented from falling due to the weight thereof.

According to an embodiment of the present invention, the insertion pin 122, when placed in the fall prevention section 236, should be lifted by at least a first length L1 to be pushed to the outside of the guide rails 232 and 234 via the entrance and exit opening 234, thereby preventing the power supply module 10 from falling off of the guide rails 232 and 234 due to falling impact.

Figure 9:
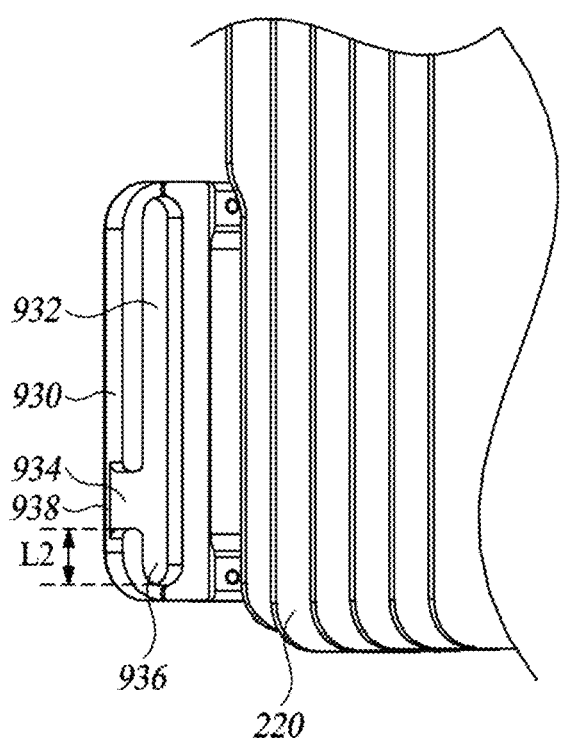
FIG. 9 is a partial perspective view of an antenna device according to another embodiment of the present invention.

FIG. 9 is a partial perspective view of an antenna device according to another embodiment of the present invention.

Referring to FIG. 9, an antenna device according to another embodiment of the present invention includes closed guide rails 932 and 934 and thus is different from the antenna device 1 with the guide rails 232 and 234 which are of an open slot type according to the previous embodiment of the present invention.

The antenna device according to another embodiment of the present invention will now be described focusing on the differences from the antenna device 1 of the previous embodiment, and components thereof which are substantially the same as those of the antenna device 1 of the previous embodiment will be assigned the same reference numerals and will not be redundantly described herein.

In the antenna device according to another embodiment of the present invention, a first module fastening part 930 further includes a closed sidewall 938. The closed sidewall 938 may be located at an outer side of the guide rails 932 and 934 and may be configured to block the inside of the guide rails 932 and 934 from the outside.

The guide rails 932 and 934 may extend in a lengthwise direction of a main body housing 250, i.e., in the same direction as a first radiation fin 220. The guide rails 932 and 934 may include a fall prevention section 936 between one end of each of the guide rails 932 and 934 and an entrance and exit opening 234, and a fastening guide section 932 between another end of each of the guide rails 232 and 234 and the entrance and exit opening 934.

Figure 10:
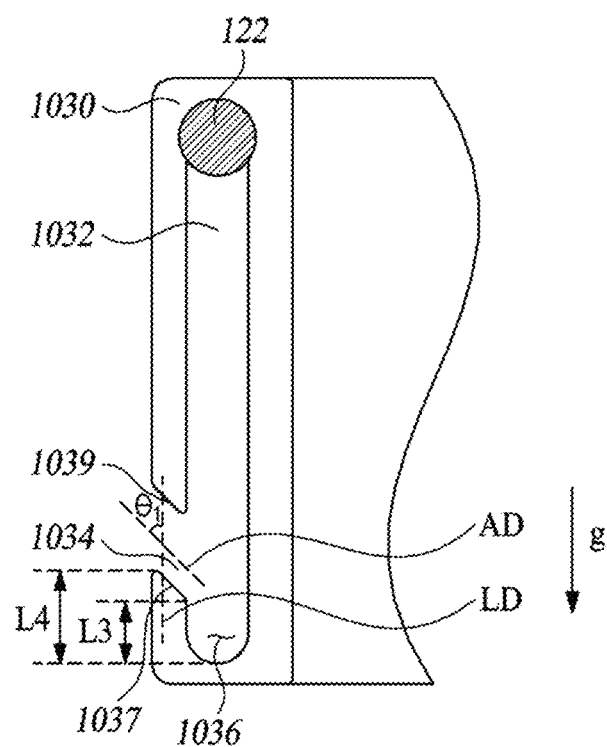
FIG. 10 is a partial cross-sectional view of a first module fastening part of an antenna device according to another embodiment of the present invention.

FIG. 10 is a partial cross-sectional view of a first module fastening part of an antenna device according to another embodiment of the present invention.

Referring to FIG. 10, an antenna device according to another embodiment of the present invention is different from the antenna devices of the previous embodiments, in that an entrance and exit opening 1034 that opens at an angle is provided.

The antenna device according to another embodiment of the present invention will now be described focusing on the differences from the antenna devices of the previous embodiments, and components thereof which are substantially the same as those of the antenna devices of the previous embodiments will be assigned the same reference numerals and will not be redundantly described here.

An entrance and exit opening 1034 of the antenna device according to another embodiment of the present invention may include inclined sides 1037 and 1039, which have an inclination angle θ1 in an outward direction of one edge of a first module fastening part 1030, in a direction from an end of each of guide rails 1032 and 1034 each having a fall prevention section 1036 to another end thereof.

In another embodiment of the present invention, when the fall prevention section 1036 has a third height L3, an insertion pin 122 is prevented from jumping over the inclined side 1037 having a fourth height L4 due to falling impact, thereby effectively preventing the insertion pin 122 from falling off of the guide rails 1032 and 1034 due to falling impact. Furthermore, the inclined side 1037 is provided to cause the insertion pin 122 to slide in the direction of gravity, and thus, the insertion pin 122, when bouncing due to impact, may slide on the inclined side 1037 and re-enter the fall prevention section 1036 of the guide rails 1032 and 1036.

Figure 11:
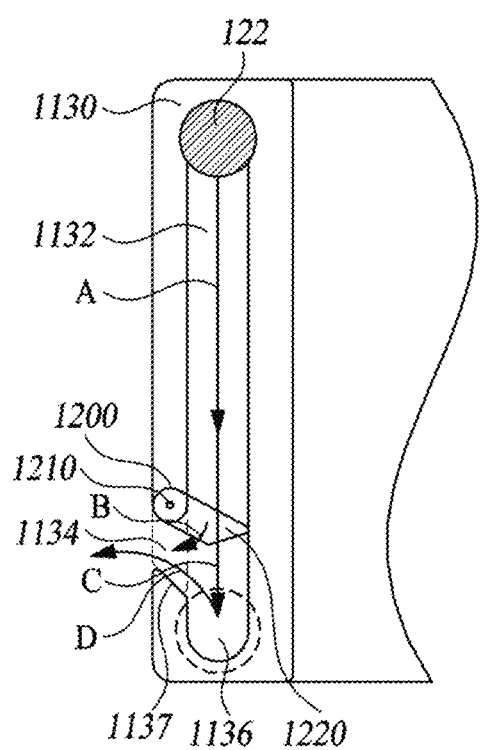
FIG. 11 is a partial cross-sectional view of a first module fastening part of an antenna device according to another embodiment of the present invention.

FIG. 11 is a partial cross-sectional view of a first module fastening part of an antenna device according to another embodiment of the present invention.

Referring to FIG. 11, the antenna device according to another embodiment of the present invention is different from the antenna device of FIG. 10 according to the previous embodiment of the present invention, in that the antenna device includes a rotary fall prevention member.

The antenna device according to another embodiment of the present invention will now be described focusing on the differences from the antenna device of the embodiment of FIG. 10, and components thereof which are substantially the same as those of the antenna device of the embodiment of FIG. 10 will be assigned the same reference numerals and will not be redundantly described here.

An entrance and exit opening 1134 of the antenna device according to another embodiment of the present invention may include inclined sides, which have an inclination angle in an outward direction of an edge of a first module fastening part 1130, in a direction from one end of each of guide rails 1132 and 1134 each having a fall prevention section 1136 to another end thereof.

A rotary fall prevention member 1200 may be provided at one side of the entrance and exit opening 1134. The rotary fall prevention member 1200 is rotatable about an axis of rotation 1210 at a side of the entrance and exit opening 1134, and may include a tip portion 1220 corresponding to the inclined side of another side of the entrance and exit opening 1134.

The rotary fall prevention member 1200 may further include a rotary spring (not shown). The rotary spring may apply an elastic force to cause the tip portion 1220 of the rotary fall prevention member 1200 to be moved close to the inclined side of the other side of the entrance and exit opening 1134. Thus, the guide rail 1132 is closed from the outside unless external force, that is, force to push the rotary fall preventing member 1200 into the guide rail 1132, is applied. Accordingly, the insertion pin 122 may be prevented from falling off.

FIG. 11 illustrates a path along which the insertion pin 122 is separated from the inside of the guide rail 1132. First, a worker may push a power supply module downward in the direction of gravity and thus the insertion pin 122 may be moved along a path A. In this case, a state of the rotary fall prevention member 1200 moved in a direction B may be maintained and thus the insertion pin 122 may be prevented from falling off to the outside of the entrance and exit opening 1134 due to impact after being moved along a path C. Thereafter, the worker may push the rotary fall prevention member 1200 into the guide rail 1132 and pull the insertion pin 122 out of the guide rail 1132 along a path D.

An internal structure and components of an antenna body of an antenna device according to an embodiment of the present invention will be described below.

<Massive MIMO Antenna Assembly with Stacked Structure>

Figure 12:
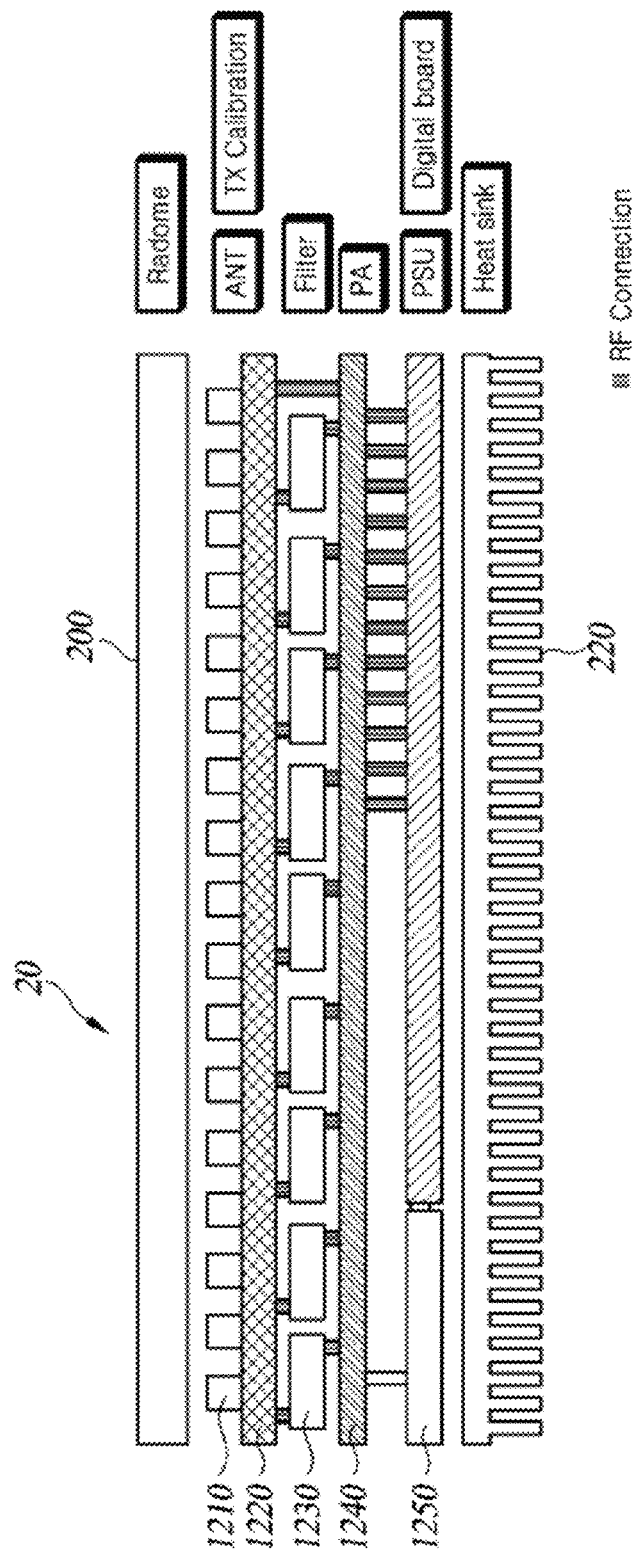
FIG. 12 is a diagram illustrating a stacked structure of an example of a massive multiple-input multiple-output (MIMO) antenna.

FIG. 12 is a diagram illustrating a stacked structure of an example of a massive MIMO antenna.

FIG. 12 illustrates an antenna body 20 as a configuration of a massive MIMO antenna. The antenna body 20, which is a massive MIMO antenna, includes a radome 200, a housing having a heat sink, i.e., a radiation fin 200, on an outer side thereof, and an antenna assembly arranged between the radome 200 and the radiation fin 200. The antenna assembly includes a stacked structure of modules on which RF elements and digital elements are provided. Major modules of the antenna assembly illustrated herein may be largely divided into six layers.

A first layer includes a printed circuit board (PCB) 1220 on which a calibration network is provided, and a plurality of antenna elements 1210 on the PCB 1220. A second layer includes a plurality of filters 1230 electrically connected to signal lines of an RF feeding network on the first layer via an RF interface such as an RF connector.

A third layer includes a PCB 1240 on which an analog processing circuit such as a power amplifier (PA) is provided. Power amplifiers included in the analog processing circuit are electrically connected to the corresponding filters 1230 on the second layer via the RF interface. In addition, the analog processing circuit is connected to the calibration network via the RF interface.

A fourth layer includes a digital board 1250 on which a digital processing circuit is provided, and a power supply unit (PSU) 1250. The digital board 1250 converts a digital signal received from a base band unit (BBU) of a base station into an analog RF signal, and converts an analog RF signal received via an antenna into a digital signal and transmits the digital signal to the BBU of the base station. The digital board 1250 is connected to the PCB 1240 of the third layer, on which the analog processing circuit is provided, via the RF interface.

Figure 13:
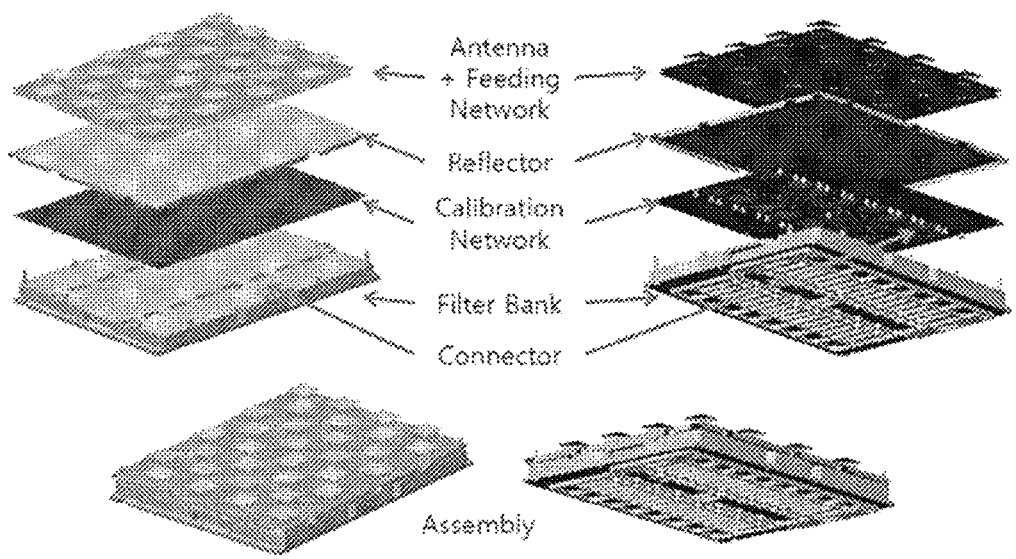
FIG. 13 is an exploded view of an example of a sub-assembly including a first layer and a second layer of the stacked structure of FIG. 12.

FIG. 13 is an exploded view of an example of a sub-assembly including the first layer and the second layer of the stacked structure of FIG. 12.

As illustrated in FIG. 13, a plurality of sublayers corresponding to the first layer and a filter bank corresponding to the second layer are combined to form a sub-assembly of an antenna assembly. A first sublayer includes a PCB on which an RF feeding network is provided, and a plurality of antenna elements on the PCB. A second sublayer includes a reflector, and a third sublayer includes a PCB on which a calibration network is provided. The first to third sublayers of the first layer may be embodied as a multilayer PCB. In particular, referring to FIG. 12, a filter bank including a plurality of filters therein is fastened with the sublayers. The filter bank is a structure for securing blind mating connection of the plurality of filters and a clamping force, and inevitably increases a size of the sub-assembly.

In each of the stacked structures of FIGS. 12 and 13, the calibration network is located between the antenna and the filters. Generally, the calibration network includes a plurality of switches and is connected to RF couplers coupled to rear ends of the filters. Thus, the feeding network and the filters should be connected via an RF connector (e.g., a standard RF interface such as a coaxial connector). Because an analog board with a power amplifier and a digital board are configured as separate layers, an RF connector is also used as an RF interface between the analog board and the digital board. As described above, a MIMO antenna system as illustrated in FIGS. 12 and 13 includes a plurality of layers and the plurality of layers are connected via an RF connector, thereby preventing reduction of the weight and size of the MIMO antenna system.

The present invention suggests a massive MIMO antenna system with a slimmer and more compact stacked structure.

Figure 14:
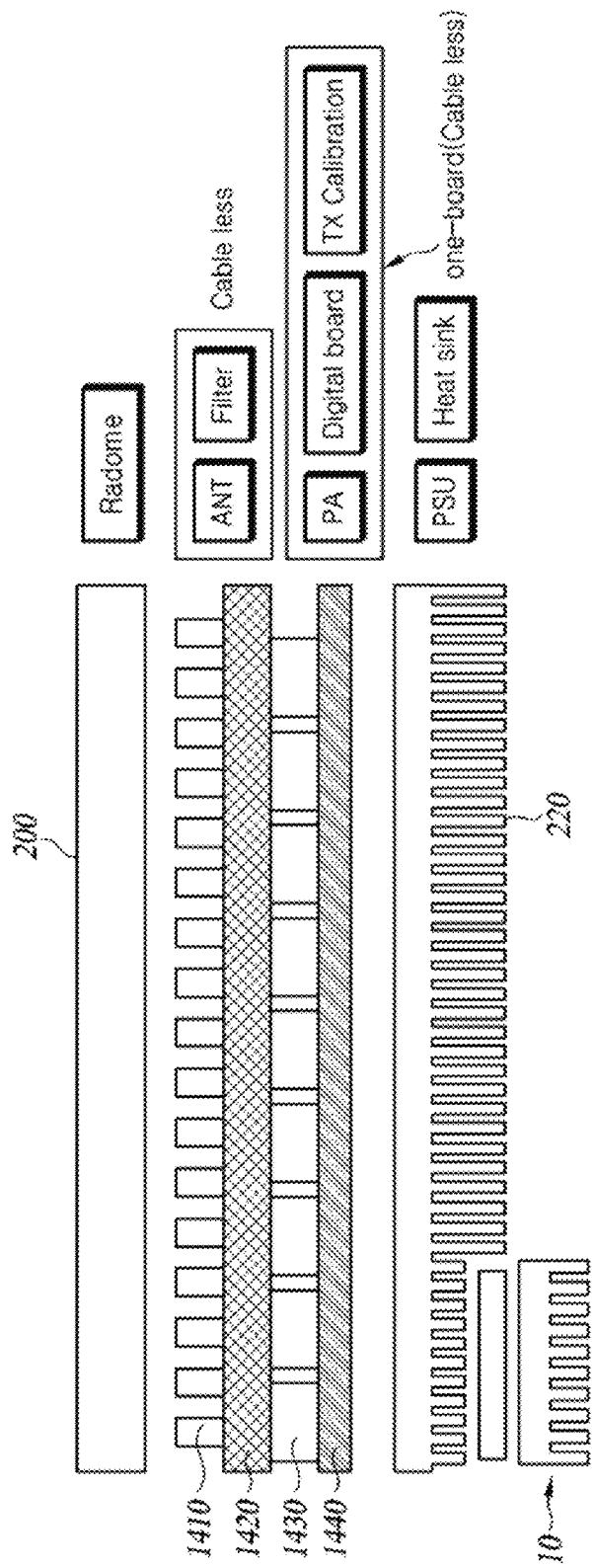
FIG. 14 is a diagram illustrating a stacked structure of a massive MIMO antenna system according to an embodiment of the present invention.
Figure 15:
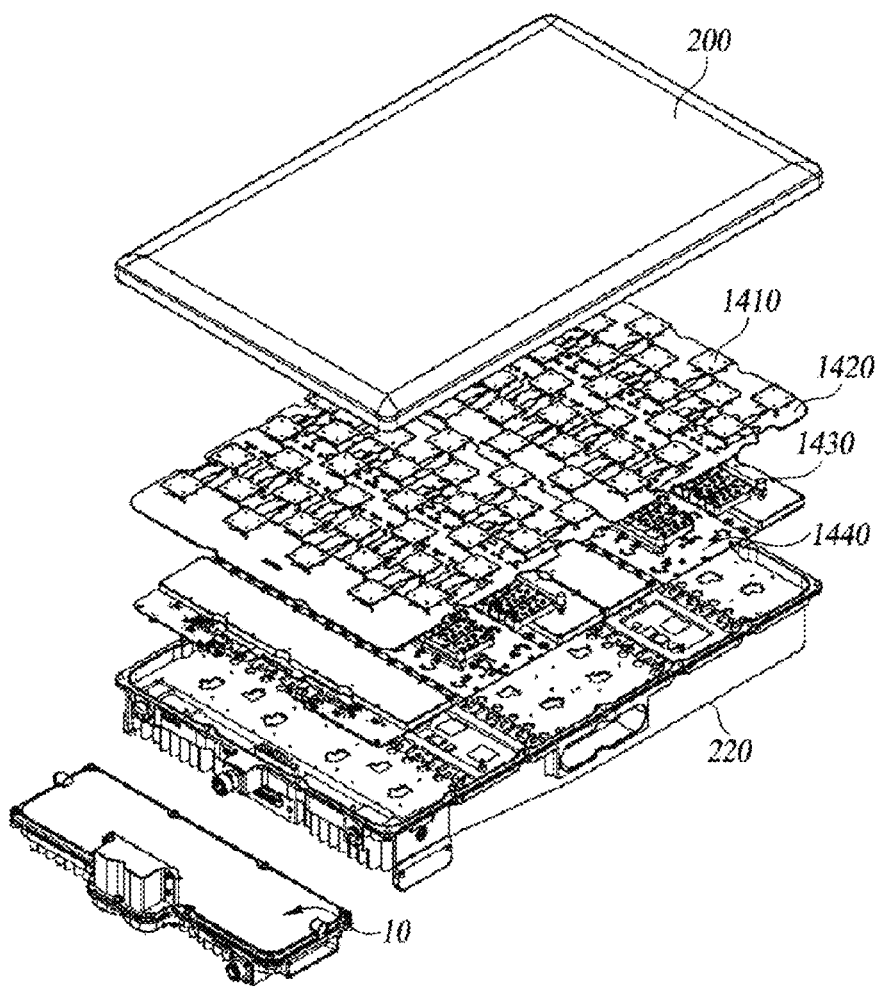
FIG. 15 is an exploded view of a massive MIMO antenna employing the stacked structure of FIG. 14, according to an embodiment of the present invention.
Figure 16:
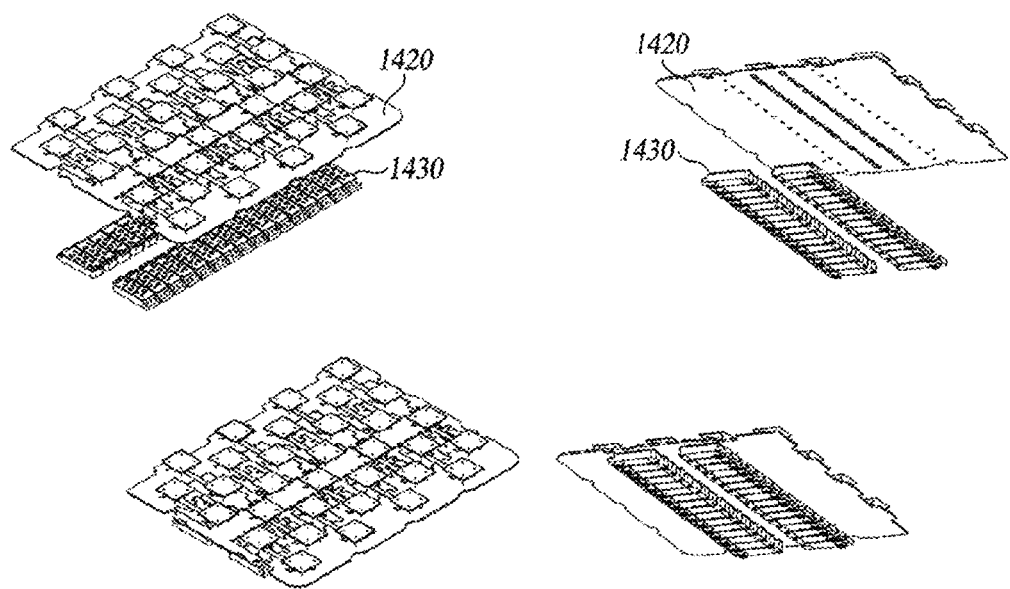
FIG. 16 is an exploded view of a sub-assembly in which filters are coupled to a first printed circuit board (PCB) coupled with an antenna element, according to an embodiment of the present invention.

FIG. 14 is a diagram illustrating a stacked structure of a massive MIMO antenna system according to an embodiment of the present invention. FIG. 15 is an exploded view of a massive MIMO antenna employing the stacked structure of FIG. 14, according to an embodiment of the present invention. FIG. 16 is an exploded view of a sub-assembly in which filters are coupled to a first PCB coupled with an antenna element, according to an embodiment of the present invention.

As will be described below, according to the present invention, calibration is performed not on a front end of an antenna element 1410, but on a front end of a filter 1430 (i.e., an output terminal of a power amplifier). That is, calibration is performed using a signal from the output terminal of the power amplifier by including a fixed phase deviation of each filter as an offset value. That is, calibration may be performed with respect to each of transmission paths after an RF deviation of a plurality of band-pass filters measured in advance is included as an offset value in a deviation between the transmission paths. In addition, calibration may be performed with respect to each of reception paths after an RF deviation of a plurality of band-pass filters measured in advance is included as an offset value in a deviation between the reception paths. A phase deviation caused by filters and an antenna feeder line may be managed at an acceptable level by producing or using filters with a fixed phase deviation. By performing calibration at the output terminal of the power amplifier, a calibration network, which was provided between an antenna element and a filter in the related art, may be provided on one board, together with a power amplifier and a digital circuit, and filters may be closely coupled to the bottom of a PCB on which a feeding network is provided. In other words, the present invention employs a strategy wherein an antenna assembly is reduced to a compact size while managing the phase deviation caused by the filter and antenna feeder line at an acceptable level.

As illustrated in FIG. 14, in a stacked structure according to an embodiment of the present invention, a calibration network is provided on one board 1440, together with a power amplifier and a digital circuit. Thus, it is not necessary to connect the power amplifier, the calibration network, and the digital circuit via an RF cable. Furthermore, the stacked structure of FIG. 14 includes a smaller number of layers than that of FIG. 12.

A MIMO antenna assembly according to the present embodiment includes a first PCB 1420 and a second PCB 1440. An RF feeding network is provided on the first PCB 1420. A plurality of antenna elements 1410 are coupled to an upper surface of the first PCB 1420 to be electrically connected to the RF feeding network, and a plurality of band-pass filters 1430 are closely coupled to a lower surface of the first PCB 1420 to be electrically connected to the RF feeding network. At least one ground plane is provided on the first PCB 1420, and may function as a reflector for the plurality of antenna elements 1410. That is, the at least one ground plane on the first PCB 1420 is used as a reflector and thus the reflector illustrated in FIG. 13 may be omitted. A digital processing circuit configured to perform baseband processing, an analog processing circuit providing a plurality of transmission/reception (TX/RX) circuits, and a calibration network are provided on the second PCB 1440. The band-pass filters 1430 are electrically connected to signal lines of the first PCB 1420 and the second PCB 1440.

<Reference numerals>

| | |
|---|---|
| 1: Antenna device | 10: Power supply module |
| 20: Antenna body | 100: Module housing |
| 110: Second radiation fin | 120: Second module fastening part |
| 200: Radome | 210: Wired transmitting and receiving terminal |
| 220: First radiation fin | 230: First module fastening part |

The invention claimed is:

1. An antenna device comprising:
an antenna body; and
a power supply module detachably attachable to the antenna body,
wherein the antenna body comprises:
a main body housing;
a first radiation fin on a surface of the main body housing;

a first power connector at a side of the main body housing; and
a first module fastening part on the surface of the main body housing,
the power supply module comprises:
a module housing;
a second radiation fin on one surface of the module housing;
a second power connector provided on another surface of the module housing, and electrically connectable to the first power connector; and
a second module fastening part detachably fastened with the first module fastening part,
the first radiation fin comprises a fastening region overlapping the power supply module and a non-fastening region not overlapping the power supply module while the power supply module is fastened with the antenna body,
the power supply module is provided on at least a portion of the fastening region of the first radiation fin,
the first radiation fin has a first thickness in the non-fastening region in a thickness direction of the antenna body, and has a second thickness in the fastening region in the thickness direction of the antenna body, wherein the first thickness is greater than the second thickness, and
the first power connector and the second power connector are electrically connected at one end of the fastening region.

2. The antenna device of claim 1, wherein the first radiation fin comprises plate members extending in parallel in a lengthwise direction of the antenna body.

3. The antenna device of claim 1, wherein the first radiation fin is integrally formed with the main body housing.

4. The antenna device of claim 1, wherein the first module fastening part extends beyond the first radiation fin from a side of the main body housing in a thickness direction of the antenna body.

5. The antenna device of claim 1, wherein the first module fastening part further comprises:
a guide rail; and
an entrance and exit opening provided in a side of the guide rail, and
the second module fastening part comprises an insertion pin configured to be inserted into the guide rail via the entrance and exit opening.

6. The antenna device of claim 1, wherein the antenna body further comprises a radome on another surface of the main body housing.

7. An antenna device comprising:
an antenna body; and
a power supply module detachably attachable to the antenna body,
wherein the antenna body comprises:
a main body housing;
a first power connector at a side of the main body housing; and
a first module fastening part provided on a surface of the main body housing, and comprising a guide rail extended along one edge of the first module fastening part and an entrance and exit opening provided in a side of the guide rail, wherein the guide rail comprises a fall prevention section between one end of the guide rail and the entrance and exit opening,
the power supply module comprises:
a module housing;
a second power connector electrically connectable to the first power connector; and
a second module fastening part detachably fastened with the first module fastening part, and comprising an insertion pin configured to be inserted into the guide rail via the entrance and exit opening, and
the insertion pin is spaced apart from the fall prevention section and is provided between the entrance and exit opening and another end of the guide rail while the power supply module is fastened with the antenna body.

8. The antenna device of claim 7, wherein the entrance and exit opening has a shape formed by opening a portion of the guide rail.

9. The antenna device of claim 7, wherein the guide rail further comprises a fastening guide section between another end of the guide rail and the entrance and exit opening,
wherein the fall prevention section is shorter than the fastening guide section.

10. The antenna device of claim 7, wherein the first power connector comprises a first power terminal,
the second power connector comprises a second power terminal, and
while the insertion pin is inserted into the guide rail, the first power terminal and the second power terminal are aligned with each other.

11. The antenna device of claim 7, wherein the antenna body further comprises a first radiation fin on a side of the main body housing, and
the first module fastening part extends beyond the first radiation fin from a side of the main body housing in a thickness direction of the antenna body.

12. The antenna device of claim 7, wherein the first module fastening part further comprises a closed sidewall at an outer side of the guide rail.

13. The antenna device of claim 7, wherein the entrance and exit opening comprises an inclined side in a direction from one end of the guide rail to another end of the guide rail, the inclined side having an inclination angle in an outward direction of one edge of the first module fastening part.

* * * * *